Jan. 5, 1932.  J. F. O'CONNOR  1,840,124
FRICTION SHOCK ABSORBING MECHANISM
Filed Feb. 15, 1929
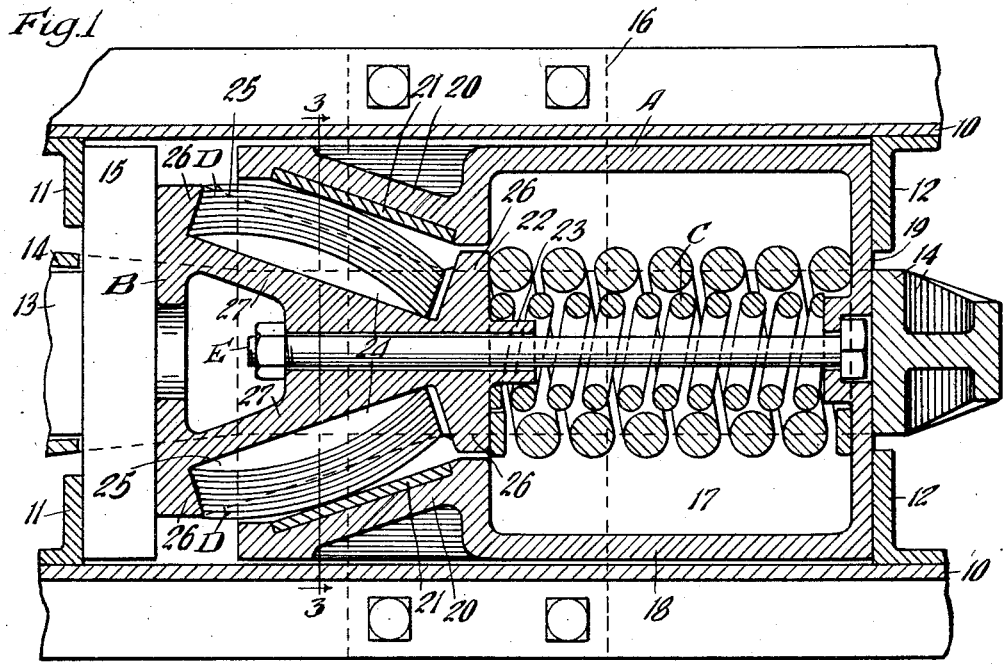
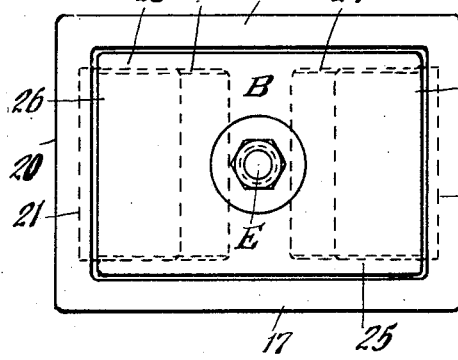
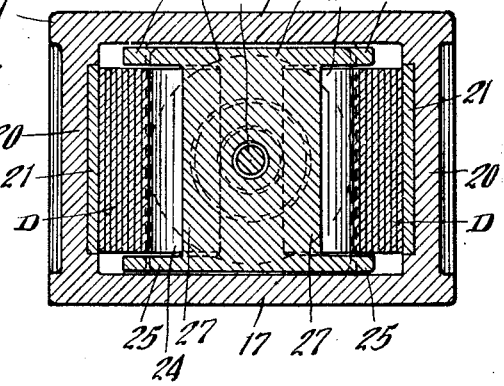
Inventor
John F. O'Connor
By Joseph Harris
His Atty.
Witness
Wm. Geiger Patented Jan. 5, 1932

1,840,124

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

FRICTION SHOCK ABSORBING MECHANISM

Application filed February 15, 1929. Serial No. 340,264.

This invention relates to improvements in friction shock absorbing mechanisms.

One object of the invention is to provide a friction shock absorbing mechanism including a casing member and a relatively movable spreading member and plate spring means at opposite sides of the spreading member adapted to be compressed between the latter and the casing walls, thereby providing yielding resistance, and wherein the plate springs are held against lengthwise movement with respect to one of the members and have frictional engagement with the other to increase the resistance of the mechanism.

Another object of the invention is to provide a friction shock absorbing mechanism including two members relatively movable with respect to each other in a direction lengthwise of the mechanism, having laterally facing, opposed abutment surfaces adapted to approach each other during movement of one of said members toward the other lengthwise of the mechanism, and laminated plate spring means interposed between the abutment surfaces and held against lengthwise movement with respect to one of said members and having frictional engagement with the other member to provide frictional resistance, the laminated plate spring means being compressed or flexed during relative approach of the abutment surfaces to provide yielding spring resistance in addition to the frictional resistance.

A more specific object of the invention is to provide a friction shock absorbing mechanism including a casing and a member adapted to transmit pressure, relatively movable toward and away from each other lengthwise of the mechanism, the pressure-transmitting member having inwardly converging wedge surfaces on the opposite sides thereof and the casing member having opposed interior, inwardly converging friction surfaces on the opposite side walls thereof, laminated plate spring means disposed at opposite sides of the mechanism and interposed between the pressure-transmitting member and casing walls, said plate springs being held against movement lengthwise of the pressure-transmitting member and having sliding frictional movement on the friction surfaces of the casing, whereby the laminated plate springs are flexed between the pressure-transmitting member and the side walls of the casing to provide both spring and frictional resistance.

Other and further objects of the invention will more clearly appear from the description and claims hereinafter following.

In the drawings forming a part of this specification, Figure 1 is a horizontal, longitudinal sectional view of a portion of the underframe structure of a railway car, illustrating my improvements in connection therewith. Figure 2 is a front end elevational view of the friction shock absorbing mechanism proper, illustrated in Figure 1. And Figure 3 is a vertical, transverse sectional view, corresponding substantially to the line 3—3 of Figure 1.

In said drawings, 10—10 indicate channel-shaped center or draft sills of the railway car underframe, to the inner sides of which are secured the usual front stop lugs 11—11 and rear stop lugs 12—12. The inner end portion of the coupler shank is designated by 13 and a hooded yoke 14 of well known form is attached thereto. My improved shock absorbing mechanism proper, together with a front main follower 15, is disposed within the yoke and the yoke in turn is supported by a detachable saddle plate 16 secured to the draft sills.

My improved shock absorbing mechanism comprises, broadly, a casing A; a pressure-transmitting member B; a main spring resistance C; a pair of laminated plate springs D—D; and a retainer bolt E.

The casing A is in the form of a substantially rectangular box-like member having spaced, longitudinally extending top and bottom walls 17—17, longitudinally extending spaced side walls 18—18, and a transverse rear end wall 19 cooperating with the stop lugs 12 in the manner of the usual rear follower. At the forward end, the side walls are provided with inwardly converging sections 20—20 provided with wear plate members 21—21 presenting opposed interior, longitudinally extending friction surfaces. The casing rearwardly of the wall sections 20—20 forms the spring cage portion of the casting.

The pressure-transmitting member B has a flat front end face which bears directly on the inner side of the main follower 15. At the inner end, the same is also provided with a flat abutment surface 22 adapted to engage the front end of the spring resistance C, the latter being interposed between the member B and the rear wall 19 of the casing. As shown, the spring resistance comprises an inner and an outer coil, the coils being held centered with respect to the member B by a rearwardly projecting boss 23 on the latter engaging within the coil of the inner spring. The member B is provided with pockets 24—24 at the opposite sides thereof, each pocket defined by top and bottom walls 25—25, transverse end walls 26—26, and an inner wall 27. The inner walls 27 of the two pockets converge inwardly of the mechanism, as clearly illustrated in Figure 1.

The laminated plate springs D are arranged at opposite sides of the member B and are seated in the pockets 24 thereof. Each laminated plate spring comprises a plurality of rectangular plate members which are curved lengthwise and are arranged in nested relation with the longitudinally convex surfaces outermost. The outer plate of each laminated plate spring engages the liner 21 at the corresponding side of the casing A and is adapted to slide lengthwise thereon. As shown in Figure 1, the pockets 24 are of greater length than the spring plates when in their curved condition, so that clearance is provided for the lengthening of the laminated plate springs when they are flexed, that is, when they are compressed between the abutment surfaces provided by the walls 27 of the member B and the inner surfaces of the liners 21. As will be evident, the member B and the spring plates D mounted thereon, together form a contractible wedge means or element cooperable with the wedge friction surfaces of the casing or shell A.

The mechanism is held of over-all uniform length by the retainer bolt E, and in addition the bolt E holds the spring C under a certain amount of initial compression.

The operation of my improved friction shock absorbing mechanism is as follows: During relative approach of the follower 15 and the casing A upon an inward buffing movement of the coupler 13 or an outward draft movement of the yoke 14, the member B will be forced inwardly of the casing A, thereby compressing the spring resistance C and also carrying the laminated plate springs inwardly of the casing along the friction surfaces of the inwardly converging liners 21. The plates of the springs D are forced inwardly by the transverse front end walls 26 of the pockets 24 of the member B. As will be evident during the inward movement of the member B, the abutment surfaces provided by the walls 27 of the pockets of the member B will laterally approach the friction surfaces of the liners 21. Due to this action, the laminated plate springs will be flexed and will also be slid inwardly on the liners, thereby providing both spring and frictional resistance. In addition to the frictional resistance had between the laminated plate springs and the liners of the casing, there will also be a certain amount of frictional resistance between the plates of each laminated plate spring due to slippage of the plates on each other, due to flexing of the same. Inward movement of the member B will be limited by engagement of the follower 15 with the front end of the casing A, whereupon the forces will be transmitted through the follower and the casing to the stop lugs of the draft sills.

When the actuating force is reduced, the tendency of the laminated plate springs to return to their normal curved condition and the tendency of the main spring resistance C to expand will restore the member B to its normal outermost position. Outward movement of the member B is positively limited by the retainer bolt E.

While I have herein shown and described what I consider the preferred manner of carrying out my invention, the same is merely illustrative and I contemplate all changes and modifications which come within the scope of the claims appended hereto.

I claim:

1. In a friction shock absorbing mechanism, the combination with a casing having interior opposed friction surfaces converging inwardly of the mechanism; of a pressure-transmitting member having inwardly converging surfaces on opposite sides thereof, said pressure-transmitting member being telescoped within the casing and movable relatively thereto lengthwise of the mechanism; plate springs disposed on opposite sides of the mechanism and interposed between the surfaces of the pressure-transmitting member and casing, said plate springs being movable lengthwise with said pressure-transmitting member and having sliding frictional engagement with the friction surfaces of the casing.

2. In a friction shock absorbing mechanism, the combination with a casing having inwardly converging opposed interior friction surfaces; of a pressure-transmitting member movable inwardly of the casing; spring resistance means opposing inward movement of said member, said member having abutment surfaces on opposite sides thereof; plate spring means interposed between the abutment surfaces of the pressure-transmitting member and the friction surfaces of the casing; means on said member engaging the plate spring means to force the same inwardly of the mechanism, said plate spring means having sliding frictional engagement with the friction surfaces of the casing.

3. In a friction shock absorbing mechanism, the combination with a casing having inwardly converging opposed flat interior friction surfaces; of a pressure-transmitting member movable inwardly of the casing, said member having flat abutment surfaces on opposite sides thereof, converging inwardly of the mechanism; spring resistance means opposing inward movement of the pressure-transmitting member; curved plate springs interposed between the abutment surfaces of the pressure-transmitting member and the friction surfaces of the casing; means on said pressure-transmitting member engaging the plate springs to force the same inwardly of the mechanism, said plate springs having sliding frictional engagement with the friction surfaces of the casing and opposing relative approach of the opposed surfaces of the pressure-transmitting member and casing.

4. In a friction shock absorbing mechanism, the combination with a casing having inwardly converging opposed interior friction surfaces; of a pressure-transmitting member movable inwardly of the casing, said member having pockets on opposite sides thereof provided with abutment walls converging inwardly of the mechanism; and a laminated plate spring means disposed within each pocket and interposed between the abutment wall of said pocket and the friction surface at the corresponding side of the casing, said plate springs having engagement with the front end walls of said pockets and being held against movement thereby with respect to the pressure-transmitting member, said laminated plate springs having sliding movement on the friction surfaces of the casing.

5. In a friction shock absorbing mechanism, the combination with a follower member having opposed interior wedge friction surfaces; of a contractible wedge member movable toward the follower, said contractible wedge member including plate springs disposed lengthwise of the mechanism and having frictional engagement with said opposed wedge friction surfaces of the follower and being yieldable transversely of the mechanism.

6. In a friction shock absorbing mechanism, the combination with a casing having opposed, interior wedge friction surfaces; of a contractible wedge element, said casing and element being relatively movable with respect to each other lengthwise of the mechanism, said contractible wedge element including spring plates supported on opposite sides thereof and having frictional engagement with the corresponding wedge friction surfaces of the casing, said spring plates being compressible transversely of the mechanism and being flexed by movement of the wedge element inwardly of the casing by sliding movement on the opposed wedge friction surfaces of the casing; and spring resistance means opposing relative movement of the wedge element and casing toward each other.

In witness that I claim the foregoing I have hereunto subscribed my name this 13th day of February 1929.

JOHN F. O'CONNOR.

DISCLAIMER 1,840,124.—*John F. O'Connor*, Chicago, Ill. FRICTION SHOCK ABSORBING MECHANISM. Patent dated January 5, 1932. Disclaimer filed April 27, 1932, by the assignee, *W. H. Miner, Inc.*

Hereby disclaims from the scope of claim 2 of Patent No. 1,840,124 any friction shock absorbing mechanism except where the "plate spring means" is composed entirely of spring plates only and the "means on" the pressure-transmitting "member engaging the plate spring means to force the same inwardly of the mechanism" engages directly the outer ends of the spring plates, and the spring plates have direct "sliding frictional engagement with the friction surfaces of the casing."

[*Official Gazette May 17, 1932.*]